Patented Dec. 15, 1931

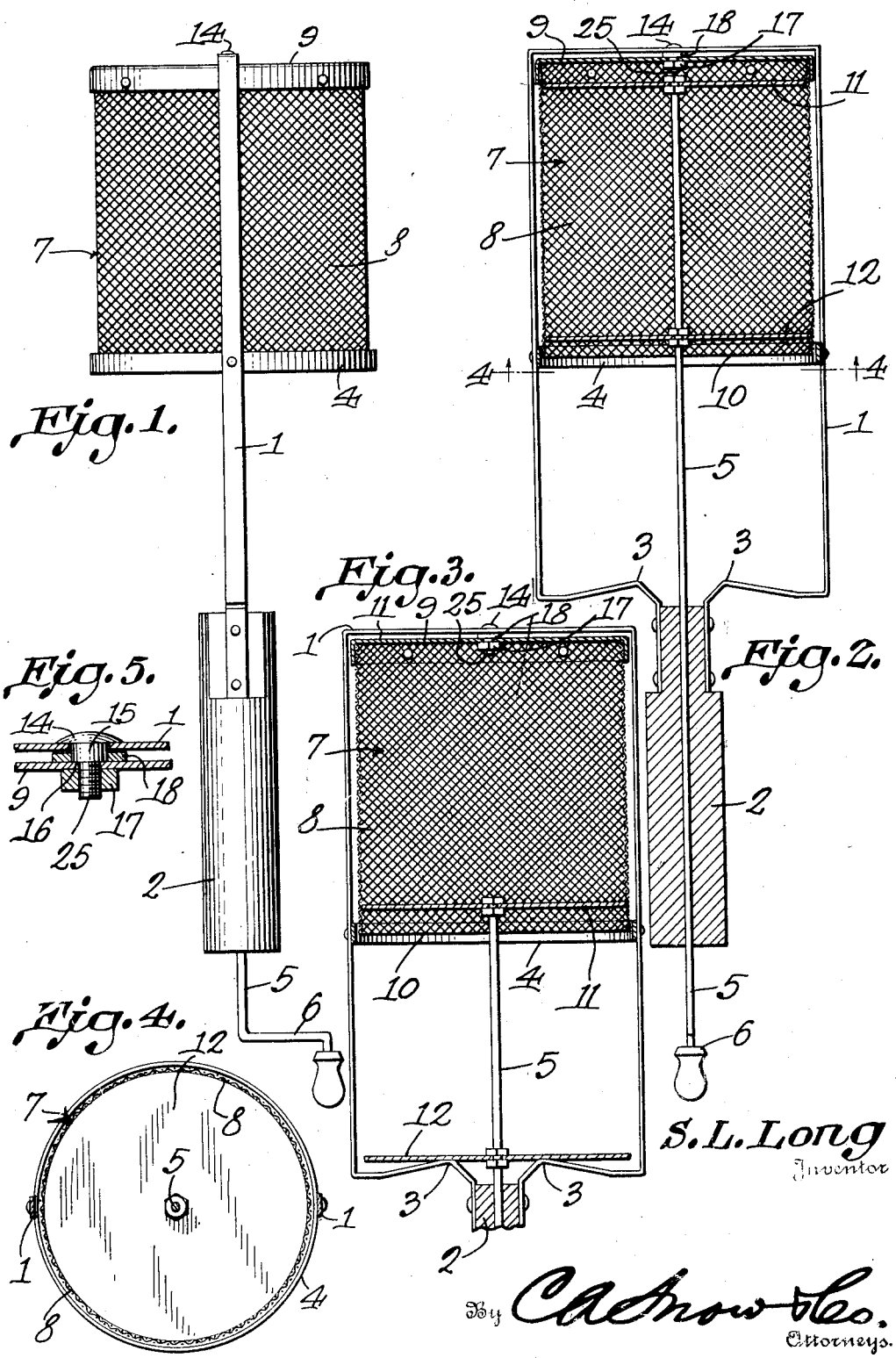

1,836,479

UNITED STATES PATENT OFFICE

SIDNEY L. LONG, OF MINNEAPOLIS, MINNESOTA

CORN POPPER

Application filed August 5, 1930. Serial No. 473,135.

The objects of this invention are to provide novel means for rotating the drum of a corn popper; to provide novel means for holding the corn in the drum during popping, and to provide a means for ejecting the popped corn; and, generally, to improve and to enhance the utility of devices of that type to which the present invention appertains.

A preferred form has been shown, but it will be understood that a mechanic, working within the scope of the claims, can make changes in the form chosen as a material embodiment of the invention, without departing from the spirit.

In the accompanying drawings:

Figure 1 is an elevation;

Figure 2 is a longitudinal section;

Figure 3 is a longitudinal section, the combined rotator and ejector having been retracted;

Figure 4 is a cross section on the line 4—4 of Figure 2;

Figure 5 is a sectional detail showing how the drum is mounted on the frame for rotation and for sagging movement transversely of its axis of rotation.

The device forming the subject matter of this application comprises a frame including a loop-shaped member 1, to one end of which is secured a handle 2, the said end of the member 1 having stops 3. The frame comprises an annular guard 4 secured to the member 1, intermediate the ends thereof.

A shaft 5 is mounted for rotation and for longitudinal sliding movement in the handle 2 and is provided at its outer end with a crank 6 or equivalent means whereby rotation may be imparted to the shaft. An inner disk 11 and an outer disk 12 are secured to the shaft 5 in spaced relation. The disks 11 and 12 preferably are made of metal having some resiliency.

A drum 7 of any desired shape is mounted on the frame for rotation. The drum 7 preferably comprises a foraminous cylindrical body 8 open at one end, as shown at 10, the opposite end of the body of the drum being closed by a plate-like wall 9.

The numeral 25 designates a securing element having an enlarged neck 15 forming a shoulder 16, the neck 15 carrying a head 14, a nut 17 being threaded on the securing element 25.

The securing element 25 passes through the end wall 9 of the drum 7, and the end wall is bound between the nut 17 and the shoulder 16. The head 14 is located outside of the end member of the frame, and the neck 15 of the securing element is mounted to turn in the said end member of the frame. The neck 15 is mounted somewhat loosely in the end of the member 1 of the frame, and consequently the drum 7 has a sagging movement transversely of its axis, that axis being represented by the shaft 5. A washer 18 is located about the neck 15 of the securing element 25, between the end wall 9 of the drum 7 and the adjacent end portion of the member 1 of the frame, as will be understood readily when Figure 5 of the drawings is noted.

In practical operation, the disks 11 and 12 are disposed within the drum 7, as shown in Figure 2, the corn which is to be popped being located in the drum, between the disks. It is to be observed that when the parts are arranged as shown in Figure 2, the outer disk 12 acts as a closure for the open end 10 of the drum and retains the corn in the drum.

The device is held over the source of heat, in a position approximating the horizontal, and because the neck 15 of the securing element 25 is mounted loosely in the outer end of the part 1 of the frame, the drum 7 can sag a little, that is, swing transversely of its axis of rotation; and because the drum can sag as aforesaid, it will have frictional engagement with the disks 11 and 12, at their edges, or with one of the disks at least. The disks 11 and 12 are secured to the shaft 5, and when the shaft 5 is rotated by means of the crank 6, as the device is held over the fire by means of the handle 2, the disks will be rotated, the disks imparting rotation to the drum 7, thereby to agitate the corn which is being popped.

After the corn has been popped, longitudinal movement is imparted to the shaft 5, the disks 11 and 12 being retracted until the disk 12 engages the stops 3, as shown in Figure 3. During the operation last above described, the inner disk 11 acts as a rake or ejector, which removes the popped corn from the drum 7.

When the parts are arranged as shown in Figure 3, the space between the inner disk 11 and the outer end 10 of the drum 7 forms a measuring receptacle, and if this receptacle is filled with unpopped corn, the operator may be assured that he has the right amount of corn for popping when the parts are restored to the condition of Figure 2, there being no chance that the popper will go over the fire laden with a charge of corn that will be too scant on the one hand, or overcharge the drum 7 on the other hand.

The part 4 is called a guard because it extends around the open end 10 of the body 8 of the drum and prevents the body from being distorted by accidental blows, or otherwise. If the mounting of the drum at 15 in the end of the frame member 1 is loose enough so that the end 10 of the body 8 can touch the guard 4, then the guard keeps the body centered with sufficient accuracy so that the outer disk 12 can enter the body 8 of the drum when the disk 12 is moved from the position of Figure 3 to the position of Figure 2. The disk 12 can enter the body 8 of the drum readily, not only because the body of the drum is loosely mounted at 15, but also because the disk 12, like the disk 11, has some resiliency. All parts of the device, with the exception of the handle 2 preferably are made of metal, the handle 2 being constructed of some material which is a poor conductor of heat.

Attention is directed to the showing of Figures 2 and 3, which make it manifest that the popper can be charged with corn and be cleared of popped corn without burning the hands of the operator, it being necessary merely to reciprocate the disks 11 and 12 through the instrumentality of the slidably mounted shaft 5, which has a double function, in that it forms both a part of the rotating means for the drum 7, and a part of the ejecting means for the popped corn.

What is claimed is:

1. In a corn popper, a drum, means for supporting the drum for rotation; and mechanism for rotating the drum, said mechanism comprising spaced, inner and outer disks at least one of which has frictional engagement within the drum, means for rotating said disks, and for moving the disks longitudinally of the drum, one disk moving within the drum to form a corn ejector, and the other disk being movable into and out of one end of the drum to form a closure for the drum.

2. In a corn popper, a frame, a handle carried by the frame, a shaft journaled in the handle, means for rotating the shaft, a drum supported for rotation in the frame, and spaced disks on the shaft within the drum, the shaft having longitudinal movement in the handle, whereby one disk will act as a corn ejector and the other disk will act as a drum closure, one disk engaging the interior of the drum to impart rotation to the drum.

3. In a corn popper, a drum supported for rotation, a shaft supported for rotation and for longitudinal sliding movement, disks on the shaft and located in the drum, and means for stopping the longitudinal sliding movement of the shaft with one disk in the drum and one disk out of the drum, one disk having frictional engagement with the drum to impart rotation to the drum.

4. In a corn popper, a drum, cooperating elements, comprising spaced ejector and closure members movable longitudinally of the drum, one of said cooperating elements having engagement with the drum, and means for moving the ejector and closure members longitudinally of the drum, and for rotating them, to impart rotation to the drum.

In testimony that I claim the foregoing as my own, I have hereto affixed my signature.

SIDNEY L. LONG.